US006847673B2

(12) United States Patent
Dane et al.

(10) Patent No.: US 6,847,673 B2
(45) Date of Patent: Jan. 25, 2005

(54) SOLID STATE LASER DISK AMPLIFER ARCHITECTURE: THE NORMAL-INCIDENCE STACK

(75) Inventors: C. Brent Dane, Livermore, CA (US); Georg F. Albrecht, Livermore, CA (US); Mark D. Rotter, San Ramon, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/177,339

(22) Filed: Jun. 21, 2002

(65) Prior Publication Data

US 2003/0053508 A1 Mar. 20, 2003

Related U.S. Application Data

(60) Provisional application No. 60/300,325, filed on Jun. 22, 2001.

(51) Int. Cl.[7] ........................... H01S 3/091; H01S 3/092
(52) U.S. Cl. .............................. 372/75; 372/70; 372/66; 372/92; 372/101; 372/99; 372/69; 372/36
(58) Field of Search .............................. 372/36, 66, 69, 372/70, 75, 92, 99, 101, 39

(56) References Cited

U.S. PATENT DOCUMENTS

| 5,526,372 | A | | 6/1996 | Albrecht et al. | |
|---|---|---|---|---|---|
| 5,546,222 | A | * | 8/1996 | Plaessmann et al. | ........ 359/346 |
| 5,548,605 | A | | 8/1996 | Benett et al. | |
| 5,643,252 | A | * | 7/1997 | Waner et al. | ................... 606/9 |
| 5,839,446 | A | * | 11/1998 | Waner et al. | ................ 128/898 |
| 5,912,910 | A | * | 6/1999 | Sanders et al. | ................ 372/22 |
| 6,381,392 | B1 | * | 4/2002 | Hayden et al. | ............. 385/132 |
| 6,414,973 | B1 | * | 7/2002 | Hwu et al. | ..................... 372/19 |
| 6,418,156 | B1 | * | 7/2002 | Peressini | ..................... 372/66 |
| 6,466,593 | B1 | * | 10/2002 | Fukumoto | .................... 372/10 |
| 6,556,339 | B2 | * | 4/2003 | Smith et al. | ................. 359/334 |
| 6,570,902 | B2 | * | 5/2003 | Peressini | ..................... 372/72 |

OTHER PUBLICATIONS

Albrecht, G., et al., "A 1.4–kJ Solid–State Power Oscillator with Good Beam Quality," IEEE Journal of Quantum Electronics, vol. 31, No. 1, Jan. 1995, pp. 164–168.
McMahon, J., et al., "A Glass–Disk–Laser Amplifier," IEEE Journal of Quantum Electronics, vol. QE–9, No. 10, Oct. 1973, pp. 992–999.
Sutton, S., et al, "Heat Removal in a Gas Cooled Solid–State Laser Disk Amplifier," AIAA Journal, vol. 30, No. 2, Feb. 1992, pp. 431–435.
Sutton, S.B., "Mist Cooling for Defender—Global Scaling Laws," Lawrence Livermore National Laboratory, internal memorandum ALT 92–016, May 29, 1992, pp. 1–29.
Albrecht, G., et al., "Solid state heat capacity disk laser," Laser and Particle Beams, vol. 16, No. 4, 1998, Cambridge University Press, pp. 605–625.

* cited by examiner

Primary Examiner—Minsun Oh Harvey
Assistant Examiner—Delma R. Flores-Ruiz
(74) Attorney, Agent, or Firm—Michael C. Staggs; Alan H. Thompson

(57) ABSTRACT

Normal incidence stack architecture coupled with the development of diode array pumping enables the power/energy per disk to be increased, a reduction in beam distortions by orders of magnitude, a beam propagation no longer restricted to only one direction of polarization, and the laser becomes so much more amendable to robust packaging.

58 Claims, 4 Drawing Sheets

SOLID STATE LASER DISK AMPLIFER ARCHITECTURE: THE NORMAL-INCIDENCE STACK

RELATED APPLICATION

This application claims the benefit of U.S. Provisional Application No. 60/300,325, filed Jun. 22, 2001, and entitled, "A New Solid State Laser Disk Amplifier Architecture: The Normal-Incidence-Stack," which is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to diode pumped solid-state laser amplifiers. More specifically, the present invention relates to a laser disk folded amplifier architecture wherein a series stack of laser gain disks are oriented at an angle of incidence that is perpendicular or approximately perpendicular to the propagation direction of a laser beam having a predetermined wavelength.

2. Description of Related Art

Solid state-laser amplifier technology is a well-developed field wherein numerous modes of operation and embodiments have been demonstrated. One of the embodiments comprises conventional disk architecture wherein pump arrays (e.g., rows of flash lamps or diode-laser arrays) are situated in planes located on either side of one or more disk amplifiers. The disks themselves are tilted at Brewster's angle with respect to the laser beam. This is the angle at which a p-polarized laser beam experiences no reflection losses at the input and output surface of each amplifier disk. This approach was invented to scale solid state lasers to very large beam apertures, and it has served the world very well in large, single shot systems.

However, non-uniform pumping due to Brewster angle architecture generates deleterious wavefront distortions caused by the non-uniform distribution of waste heat from the optically pumping process. The result of such thermal gradients is bulk thermal deformation, an undesired change in the index of refraction, and stress in the material, all of which contribute to optical distortions of the transmitted wavefront of a laser beam to be amplified.

Several techniques have been utilized to mitigate the effects of thermal gradients during Brewster angle laser operation. First, diode pumping to match absorption lines of dopant ions in the gain materials of laser disks, reduces the amount of waste heat generated. Second, convective gas flow across the surfaces of the gain material can help dissipate heat-generated gradients. Background for such a method is described by Sutton, et al., in "Heat Removal in a Gas Cooled Solid-State Laser Disk Amplifier," AIAA Journal, Vol. 30, No. 2, pp. 431–435, (1992). Another technique is to allow a laser gain medium to temporarily store the deposited heat. During laser operation, the active laser gain medium will heat up until it reaches some maximum acceptable temperature. The cooling cycle is then begun, in the absence of lasing, and elapsed time between periods of laser operation depends largely on the efficiency of the cooling of the laser during the suspended lasing action. Background for this concept is described and claimed in U.S. Pat. No. 5,526,372, issued Jun. 11, 1996 to Albrecht, et al., and assigned to the assignee of the instant application. Regardless of which technique is applied, thermal gradients that produce bulk thermal deformation, changes in the index of refraction, and stress due to non-uniform pumping of Brewster angle disk amplifier architectures continues to be a problem in high-average power solid-state laser systems.

The emergence of high average power diode arrays beyond the conventional technologies in which typically only a single laser diode bar was attached to a single high performance heat sink have enabled monolithic laser diode packages in which multiple diode bars are attached to a single high performance heat sink. This technology advance has led to larger laser diode arrays and larger diode-pumped laser systems that are capable of emitting pump light at nonzero emission angles, which may be utilized to solve current non-uniform optical pumping as discussed above. Background for one such type of package, which utilizes Silicon Monolithic Microchannels (i.e., SiMM) is described and claimed in U.S. Pat. No. 5,548,605 issued Aug. 20, 1996 to Benett, et al., U.S. Pat. No. 5,828,683 issued Oct. 27, 1998 to Freitas, and U.S. Pat. No. 5,923,481 issued Jul. 13, 1999 to Skidmore, et al., and assigned to the assignee of the instant application.

SiMM technology incorporates the formation of V-grooves for positioning and mounting of laser diode bars by Anistropic etching of silicon substrates. In <110> oriented silicon wafers, (the surface of the wafer is a <110> plane), etch rate differences can be exploited to etch channels that are perpendicular to the surface of the wafer. This is accomplished by creating a mask on the surface of the wafer that is aligned with the <111> planes on the wafer. When etched, these slow-etching, perpendicular <111> planes then become the walls of the channels. With the appropriate angular orientation of an etch mask on a <110> oriented silicon wafer, the result of the above etching method is to produce V-grooves, wherein laser emitting diodes or laser diode bars are attached to the slanted surfaces, i.e., the <111> plane, and as such are oriented to produce an emission direction in a very specific way relative to the <110> normal direction (e.g., 55 degrees).

SiMM arrays with a 55 degree emission angle or any diode array with a nonzero emission angle, measured from the normal to the array surface are useful in pump configurations that are integrated in normal incidence large aperture laser disk architectures. Such architectures provide better energy extraction efficiencies, better beam quality despite any residual thermal gradients in the laser gain disks, polarization independent extraction, and denser, compact system packaging.

SUMMARY OF THE INVENTION

Accordingly, the present invention provides a solid-state laser amplifier operated at substantially a normal-incidence angle that is uniformly optically pumped at a selected angle $\theta$.

Another aspect of the present invention is to provide a solid-state laser disk amplifier architecture wherein one or more laser disks can be stacked at substantially a normal incidence angle while uniformly optically pumped at a selected angle $\theta$ by a diode pump array surface.

A further aspect of the present invention is to provide a method of uniformly optically pumping a normal incidence stack solid-state laser disk amplifier.

Thus, the present invention addresses the problems associated with high repetition rate, diode array or conventional flash-lamp pumped, high-power solid state lasers by replacing the classical Brewster angle disk amplifier architecture by an architecture in which the disks are oriented substantially perpendicular to an incident beam. The normal incidence orientation due to uniform optical diode array pumping of the present invention has increased the power/energy per disk, laser efficiency, and decreased the manner in which slab perturbations imprint themselves as optical beam distortions in the transmitted wavefront.

Finally, the beam propagation is no longer restricted to only one direction of polarization, and the laser becomes so much more amenable to robust packaging wherein rugged field applications now become realistically possible.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

General Description

The present invention provides an apparatus and a resulting method for operating a laser disk amplifier architecture in a uniformly optically pumped normal incidence mode.

The interest of disk amplifiers, in which the conventional architecture of the active material is in the form of separate slabs or disks set at Brewster's angle, centered on the attractive means of producing a high average power solid-state laser without encountering the problems that beset large-rod amplification systems.

Figure 1A:
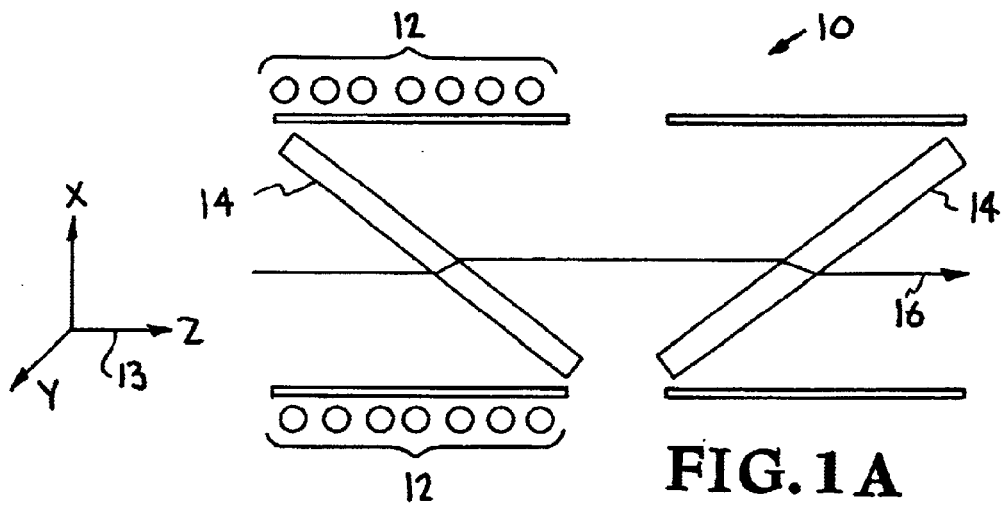
FIGS. 1(a–b) illustrates the conventional disk amplifier architecture wherein the pump arrays are in the x-z planes located on either side of laser gain disks oriented at Brewster's angle.
Figure 1B:
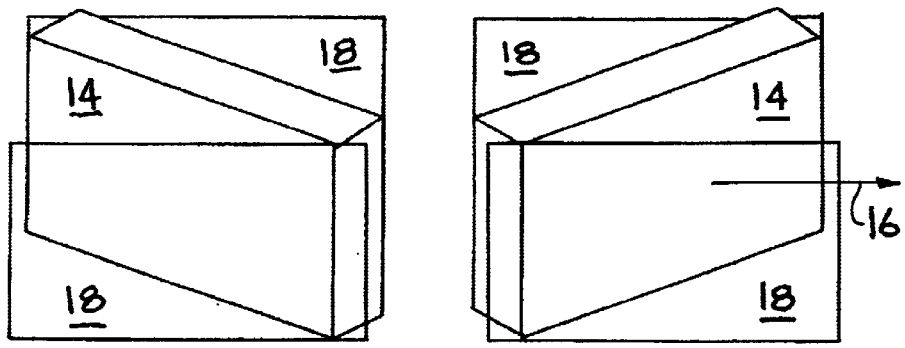

FIG. 1 demonstrates two embodiments of the "classical" disk amplifier architecture. FIG. 1a illustrates a conventional flash-lamp pumped disk amplifier architecture 10, comprising flashlamp arrays 12, oriented in an x-z plane 13 located on either side of one or more Brewster angle disks 14 with respect to a laser beam 16 propagation direction. FIG. 1b illustrates a modified version of the conventional architecture 10 comprising diode pump array surfaces 18 oriented in x-z plane 13 located on either side of one or more Brewster angle disks 14 with respect to a beam 16 propagation. The slabs or disks 14 are energy pumped from two opposing sides using flash lamps 12 in FIG. 1a or diode pump array surfaces 18 in FIG. 1b. The disks 14 themselves are tilted at Brewster's angle, (i.e., the angle at which a p-polarized laser beam experiences no reflection losses at the surfaces of an amplifier disk 14), with respect to laser beam 16 propagation along, for example, the z-axis 13 direction. This approach is described in "A glass disk laser amplifier," by J. M. McMahon, et al., IEEE JQE, Vol. 9, No. 10, pp. 992–999, 1973, and enabled solid state lasers to be scaled to very large beam apertures and high pulse energies. The emergence of high average power diode array surfaces 18 in FIG. 1b (instead of the conventional flash lamp pump arrays 12 in FIG. 1a have recently made it possible to operate large aperture solid state lasers not only single shot, but at high repetition frequencies. Original efforts on the development of this technology is described in "Solid state heat capacity disk laser," by G. F. Albrecht, et al., Lasers and Particle Beams, Vol. 16, no. 4, p. 605–625, (1998), and in claimed U.S. Pat. No. 5,526,372, issued Jun. 11, 1996 to Albrecht, et al., as previously discussed above.

Specific Description

Figure 2A:
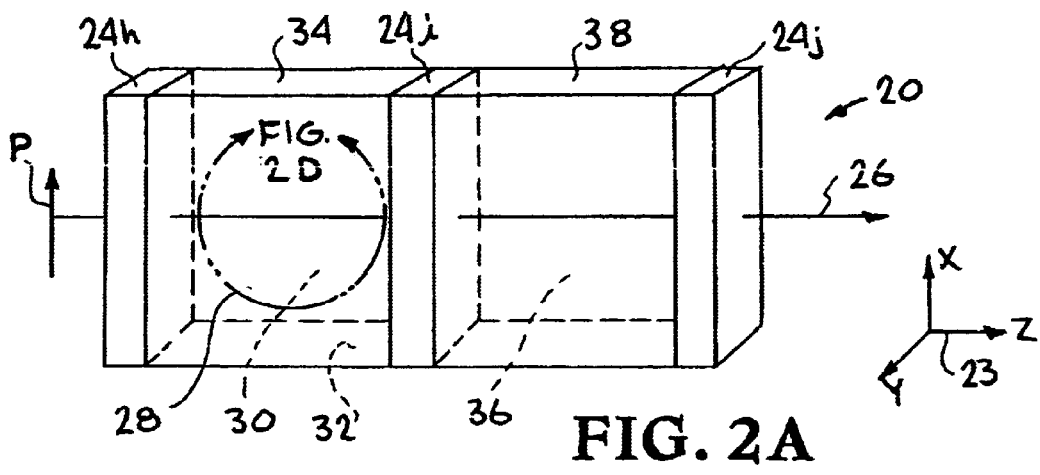
FIG. 2(a) shows Normal Incidence Stack (NISA) geometry.
Figure 2B:
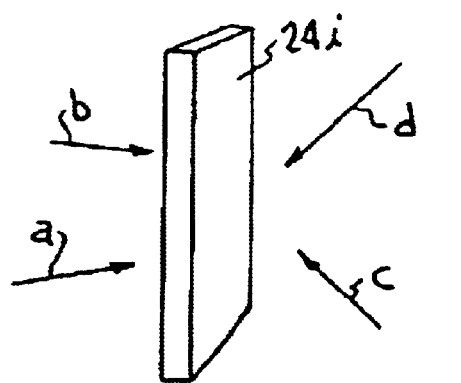
FIG. 2(b) illustrates a generic representation of four-sided laser gain disk pumping.
Figure 2C:
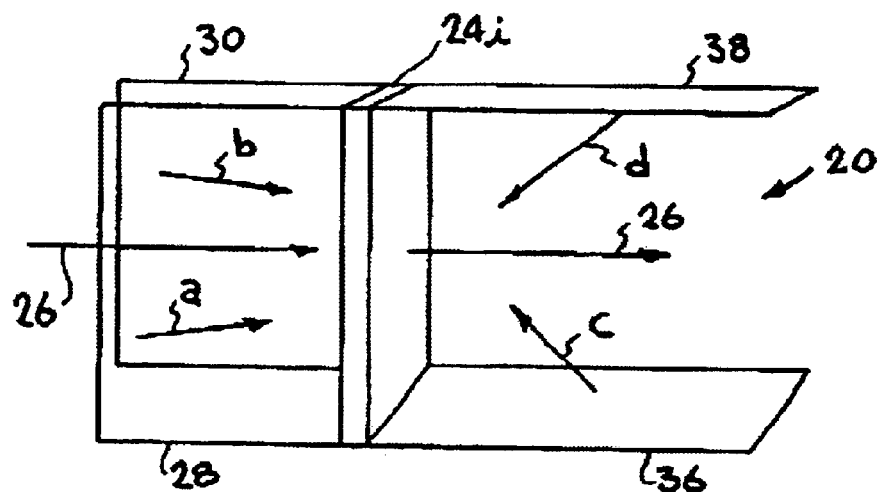
FIG. 2(c) details an laser gain disk being pumped off the horizontal axis by diode array surface and illustrates how the pumping design interlocks with adjacent laser gain disks.

FIGS. 2a–c illustrates the present invention in its most fundamental embodiment (herein referred to as a normal-incidence-stack disk amplifier 20 (NISA)). As shown in FIG. 2a, normal-incidence stack amplifier 20 comprises, a stack of laser gain materials such as disks or slabs 24h–j now situated at an angle that is perpendicular or approximately perpendicular to a propagating beam 26 capable of having a predetermined input polarization, as denoted by the letter P. An input angle (not shown) by beam 26 to front input surfaces (not shown) of laser gain disks 24h–j is for example, between about 0 degrees and plus or minus about 15 degrees with respect to a normal from front surfaces of laser gain disks 24h–j. In addition, a left front diode array surface 28; a right front diode array surface 30 (shown with a dashed line); a bottom back diode array surface 36 (shown with a dashed line); and a top back diode array surface 38 in FIG. 2a, is arranged to pump laser gain disk 24i such that optical pumping occurs from all four sides surrounding the z-beam axis 23. Typically, laser gain disks 24h–j each have a thickness ranging approximately from about 1 mm to about 40 mm and transverse dimensions ranging from about 10 mm×10 mm to about 400 mm×400 mm. A preferred laser gain medium for laser gain disks 24h–j, is Neodymium Gadolinium Gallium Garnet (Nd:GGG or "GGG" for short). However, any suitable solid-state laser gain medium such as, but not limited to Neodymium doped Yttrium Aluminum Garnet (Nd:YAG), Ytterbium doped Yttrium Aluminum Garnet (Yb:YAG), or Neodymium doped glass (Nd:Glass) capable of producing the requirements of the present invention can be employed as a substitute for laser gain disks 24h–j. Furthermore, an antireflection coating, such as a multi-layer dielectric or a single layer sol-gel, (see Steiner, et al., U.S. Pat. No. 2001/0024684 A1, titled "Process For Producing Antireflection Coatings," and Witzman, et al., U.S. Pat. No. 2001/0005553 A1, titled "Linear Aperture Deposition Apparatus And Coating Process"), can be coated on the surfaces of laser gain disks 24h–j, specifically for a predetermined gain wavelength, for example 1061 nm, and for a selected emission band from diode array surfaces 28, 30, 32, 34, 36, 38.

FIG. 2b illustrates the generic case that any pump array configuration which has pump light A, B, C, D incident on laser gain disk 24i from four directions as indicated, will provide suitable pump light absorption within the disk. As opposed to the classical Brewster's angle arrangement, 14 in FIG. 1, where the disk is pumped from only two pump array surfaces, 12, 18 in FIG. 1, the normal-incidence-stack disk arrangement, 24h–j in FIG. 2a, allows stronger pumping for a limited pump array capability, which leads to more power per disk. Anyone reasonably skilled in matters of laser extraction immediately understands that this also results in higher device efficiency. For this four-sided pumping scheme to work, the pump radiation needs to impinge on the slab or laser gain disk 24i from the directions A, B, C, D indicated by the arrows sketched in FIG. 2b.

FIG. 2c shows an example of optically pumping a laser gain disk 24i in a normal-incidence-stack disk amplifier 20. In this embodiment, exemplary diode array surfaces 28, 30, 36, 38 emit pump radiation A, B, C, D at an angle off the horizontal plane, (i.e., off of the z-direction 23, which is collinear to a beam 26 propagation direction) because of the construction principles of diode pump array technology, such as exemplified in SiMM architecture. Examples of Simm architecture are described and claimed as stated herein before, in U.S. Pat. No. 5,548,605 issued Aug. 20, 1996 to Benett, et al., U.S. Pat. No. 5,828,683 issued Oct. 27, 1998 to Freitas, and U.S. Pat. No. 5,923,481 issued Jul. 13, 1999 to Skidmore, et al., and assigned to the assignee of the instant application. However, any diode array with a nonzero emission angle, measured from the normal to an array surface, can be successfully applied to the present invention. The pumping by four diode pump array surfaces 28, 30, 36, 38 in FIG. 2c, (i.e., pump array panels), from two sides, enables each laser gain disk 24h, 24i, 24j, in FIG. 2a within a normal-incidence stack amplifier 20 laser cavity to be pumped in the same way. Thus, a neighboring laser gain disk (e.g., 24h in FIG. 2a), pumped just like laser gain disk 24i depicted in FIGS. 2a and 2c, enables left front and back pump array surfaces 28, 30 in FIG. 2c to fit right into the spaces of top and bottom right pump array surfaces 32, 34 of first laser gain disk 24h in FIG. 2a, resulting in the architecture shown in FIG. 2c. This inter-locking of pump array surfaces of neighboring laser gain disks or slabs leads to a shortening of the laser head (i.e., a shorter, more compact laser head) by nominally a factor of two. There is no equivalent arrangement that could accomplish a similar inter-locking effect for Brewster angle laser gain disks 14 in FIGS. 1a–b. The exact amount of shortening depends on such details as the refractive index, the emission angle of the diode pump array surfaces 28, 28, 30, 36, 38 in FIG. 2c, and a flow window design for cooling of each laser gain disk 24h, 24i, 24j, in FIG. 2a.

Figure 2D:
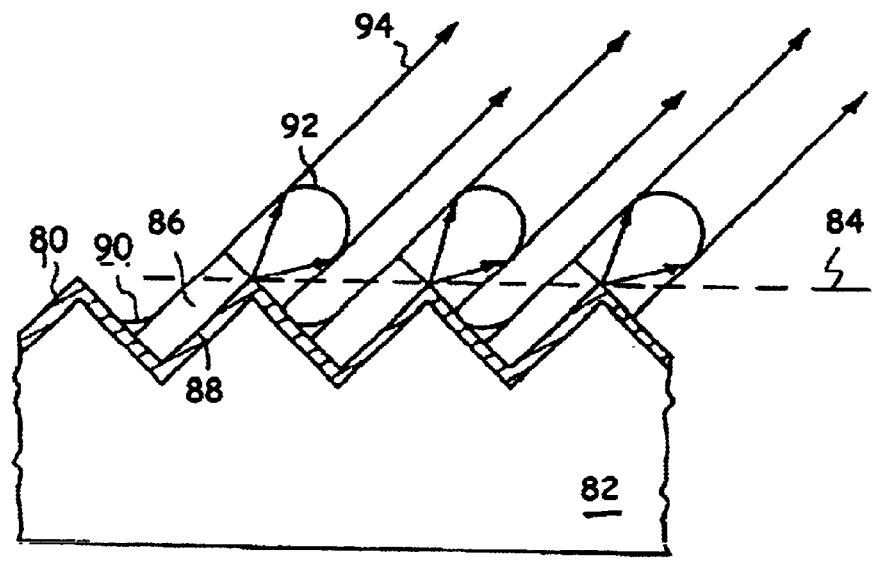
FIG. 2(d) shows the basic concept of SiMM and V-BASIS technology.

FIG. 2d shows the basic concept of SiMM and V-BASIS technology, as discussed above, that make up diode array surfaces, e.g., 28, 30, 32, 34, as shown in FIG. 2A. In FIG. 2d, a V-groove 80 is defined by etching or cutting a <111> plane of silicon substrate 82 with respect to a silicon <110> substrate surface plane 84 (shown by the dotted line). Laser diodes or laser diode bars 86 are located against a metalization layer 88 and are soldered into place with solder 90. Lenses 92 are located in proximity to the output face of laser diode bars 86 so as to direct an emission 94 from laser diode bars 86 to, for example gain medium 24i, as shown in FIG. 2A.

It should be noted that another difference between the classical Brewster's angle laser gain disk 14 shown in FIGS. 1a–b and any laser gain disk 24h–j in FIG. 2a, is that a square disk of the same beam-normal area experiences lower Amplified Spontaneous Emission losses (ASE). If the height of laser gain disk 24i in FIG. 2a is denoted by h, the width of Brewster angle laser gain disk 14 in FIGS. 1a–b, is given by $h(1+n^2)^{1/2}$ (n is the refractive index of the disk material). Hence, for a refractive index of ~2, (e.g., n=1.94 for Nd:GGG), Brewster angle laser gain disk 14 in FIG. 1 is approximately over 2 times longer in one direction than in the other. The height and width of a normal-incidence-stack laser gain disk 24i in FIG. 2a are equal and, for the same beam-normal area, is given by $h(1+n^2)^{1/4}$. Hence, for the same refractive index and area, the normal-incidence-stack disk is almost a factor 1.5 shorter than the long dimension of Brewster angle laser gain disk 14 in FIGS. 1a–b. This has an important consequence with respect to losses caused by amplified spontaneous emission (ASE). In order to operate efficiently, a laser must have a certain minimum product of the gain coefficient $g_o[1/cm]$ and the length over which that gain is experienced L[cm], leading to a fundamental laser figure of merit, the dimensionless product $g_oL$. One typically tries to achieve a $g_oL$ of over 2 in the beam direction in order to get efficient lasing operation. Note, however, that the beam direction is not the only direction in which photons experience amplification. They also experience amplification travelling inside the disk along the height, width or diagonal dimension, without ever leaving it. Then, stored lasing energy is lost to the beam direction, and thus to the output power. These losses are a serious concern in all large aperture lasers and are referred to as ASE losses. Since the gain coefficient is given by the strength of the pumping, it can be shown that a laser gain disk which is too large will have more ASE losses than one which has the same gain coefficient $g_o$, but is smaller in the dimension L. This effect is the key reason why the series stack laser gain disks 24h–j in FIG. 2a, being smaller than Brewster angle disk 14 in FIGS. 1a–b for the same beam-normal area and the same $g_oL$ product, can be pumped to higher gain coefficients. It is this higher gain coefficient which, allows more energy and power per disk and better extraction efficiencies. This last point is known in the art to anyone schooled in lasers.

There are a variety of other useful benefits that come with normal-incidence stack architecture. First, normal-incidence stack architecture reduces polarization effects. Brewster's angle disks 14 in FIGS. 1a–b act as beam polarizers, and an amplifier with many Brewster angle disks amounts to a polarizer that has a very high polarization contrast. Therefore, only the p-polarized light will propagate through a Brewster angle disk amplifier without large optical losses. This, in turn, greatly hampers the possibilities for a multi-pass architecture, requiring active electro-optic switches which become exceedingly costly and complicated for large aperture multipass extraction architectures. The normal-incidence-stack architecture does not have this restriction, since it efficiently propagates any direction of polarization. Very simple four pass geometries with passive devices, well known to laser professionals, are now possible. Temperature gradients also lead to stress distributions in the laser amplifier disks that can cause depolarization of the transmitted laser beam and in turn cause reflective losses at the surfaces of the Brewster disks. Since the normal-incidence-stack architecture does not introduce polarization losses, it is possible to consider advanced laser architectures in which passive correction of the disk depolarization is possible using Faraday or waveplate polarization rotators between each amplifier pass.

Second, normal-incidence stack architecture results in smaller beam distortions in the transmitted wavefront. There are two principal sources of thermally-induced optical distortions in solid-state amplifiers: (1) variations in the refractive index due to temperature and stress and (2) dimensional changes in the laser gain medium caused by the coefficient of thermal expansion (positive or negative). For the case of large aperture Brewster disks 14 in FIGS. 1a–b, it has been shown that the most important source of optical distortion is the bending of the flat amplifier disk caused by unbalanced heating through its thickness, from one side of the disk to the other. When a laser beam propagates through this bent disk at Brewster's angle, optical distortions are imprinted on the beam. However, if the same bent disk is placed in the beam perpendicular to the direction of propagation, very little distortion results. To see how the beam distortions are reduced in a normal-incidence geometry, one only has to apply Snell's Law, (i.e., a law that defines an incident and refracted ray with respect to a surface normal when traveling from one medium into another). One can show that the amount of beam steering (or the difference between the exit and entrance angles) is proportional to $\sin(\theta)$, where $\theta$ is the angle of incidence. Thus, a significant reduction in beam steering is obtained in the normal incidence geometry ($\theta$ substantially near zero) vs. the Brewster's angle geometry ($\theta$ near 60 degrees).

In addition, thermal distortions experienced in a Brewster disk architecture imprint themselves on the transmitted beam wavefront to order linear in $\alpha T$. Here, $\alpha$ is the coefficient of thermal expansion of the disk, $\Delta T$ is the temperature difference between two points on the disk which arises from pump deposition non-uniformities. Typical magnitudes of $\alpha \Delta T$ are of order $10^{-3}$ to $10^{-4}$. The derived expression also shows that for case of the normal-incidence-stack architecture, where disks are oriented perpendicular to the beam, the same distortions imprint themselves on the beam only to order $(\alpha \Delta T)^2$, which now is of order $10^{-6}$ to $10^{-8}$. It is through this simple but effective mechanism, that the beam distortions in a normal-incidence-stack architecture are orders of magnitude smaller than in a Brewster disk architecture, for the same slab distortions. A second consideration applies even in the absence of thermally-induced optical distortions. A useful power oscillator geometry for extracting energy from a large aperture amplifier is the unstable resonator. In the case of the unstable resonator, the extraction beam continuously diverges through the amplifier from pass to pass until the high power beam escapes from the cavity. The normal-incidence-disk architecture does not introduce the astigmatic beam distortion which is intrinsic to a diverging beam propagating through a Brewster angle disk and is therefore ideally suited for use in an unstable resonator geometry, (an unstable resonator makes use of deliberately diverging laser wavefronts as the output coupling mechanism).

Figure 3:
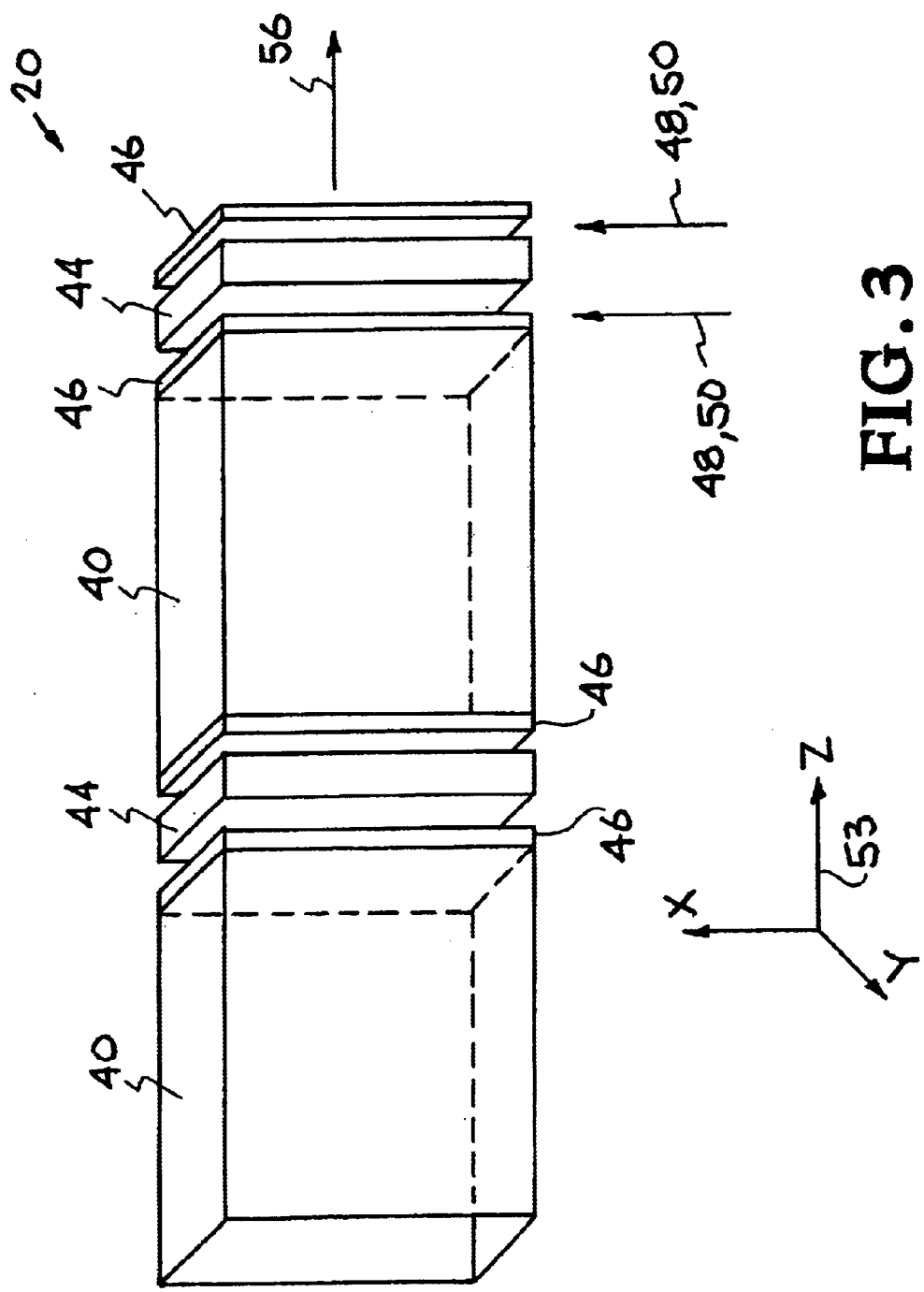
FIG. 3 represents the Normal Incidence Stack Amplifier with gas/mist flow to cool the laser slabs.

FIG. 3 shows an embodiment of the normal-incidence-stack disk amplifier 20 that addresses some of the thermal issues as discussed above. The components illustrated are, for example, diode pump array surfaces 40; a beam 56 propagating along the z-axis 53; with flow windows 46 added on either side of laser gain disk 44, so that gain disk 44 can be cooled during or for the case of heat capacity operation, after lasing. Cooling can be achieved by flowing a gas 48 or, for the most rapid cooling, phase-transition cooling through droplet evaporation 50 (i.e., liquid mist cooling) can be used. The approach of gas cooling disk amplifiers is documented in the scientific literature and is detailed as discussed herein before in "Heat removal in a gas cooled laser disk amplifier," by Sutton, et al., AIAA, Vol. 30, No. 2, p. 431–435, (1992). The method of phase transition droplet cooling is described in "Solid state heat capacity disk laser," accomplished by applying a liquid mist 50 while gas 48 is continually flowing through flow channels (not shown).

Figure 4:
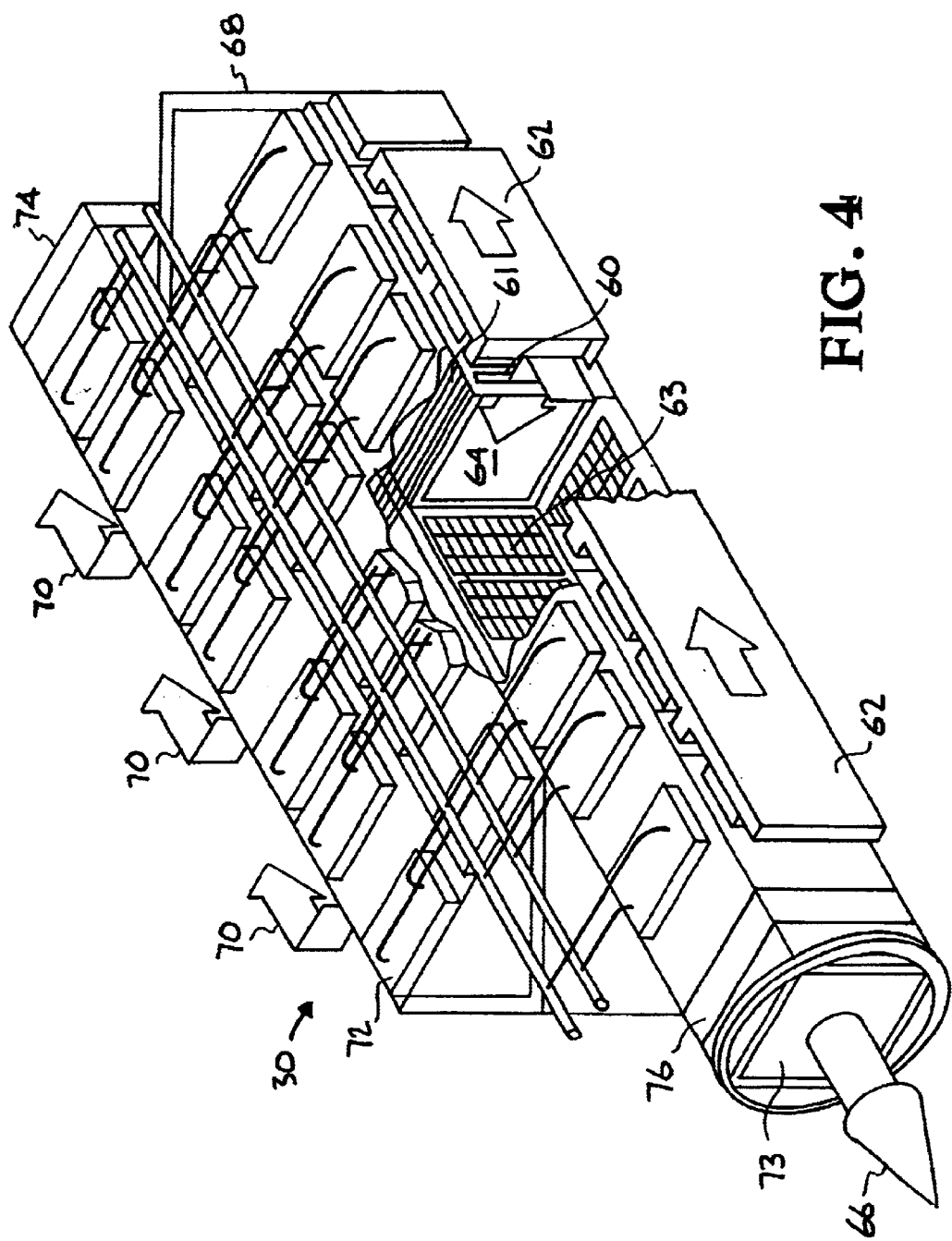
FIG. 4 represents a folded Normal Incidence Stack Amplifier with gas/mist flow to cool the laser slabs.

A preferred embodiment, configured as a power oscillator, of a normal-incidence stack laser-disk resonator 30 is exemplified in FIG. 4., wherein one or more gain disks 61 are stacked in series within a folded cavity. The components are, for example, one or more input gas/mist flow channels 60, a gas/mist supply plenum 62, one or more turning mirrors 68 for folding the normal-incidence stack laser-disk resonator 30 cavity, one or more gas/mist flow windows 64, one or more diode array pump surfaces 63 (i.e., diode array panels) further comprising electric cooling supplies 72, and one or more output gas/mist flow channels 70 to produce a high average power output beam 66, an output coupler 73 and a rear reflector 74. This engineering concept enables the number of gas/mist flow channels 60 and supply plenums 62 in laser disk resonator 30 to be reduced by the number of folds plus unity. Brewster disk based laser heads, 14 in FIG. 1, in practice allow such a stacking only in the vertical direction. Otherwise a Brewster disk architecture would be too sensitive to misalignment due to vibration input which can only be recovered at great weight expense by adding enough structure to sufficiently increase stiffness. It is recognized in the mechanical engineering arts that this consideration is of pivotal importance when the laser head needs to be packaged as part of a system which has to have practical utility under severe field conditions.

In the preferred power oscillator method of the present invention, diode arrays 63 begin to pump laser disks 61, causing their optical gain to increase. As the stored energy in disks 61 increases, small amounts of a spontaneous emitted radiation (not shown) emerges from the disks. In an exemplary power oscillator mode of operation, this spontaneous emitted radiation (not shown) is trapped by laser-disk resonator 30 as formed by output coupler 73 and high reflector 74. As the weak spontaneous emitted radiation (not shown) makes roundtrip reflective bounces between output coupler 73 and high reflector 74, it is amplified by the optical gain in amplifier disks 61, reaching high powers of at least 5 kW. Each time the circulating beam reflects from output coupler 73, a portion of beam 66 exits laser-disk resonator 30, forming output beam 66. Beam 66 coupled out through output coupler 73 can transmit through a partially reflecting optical coating, (not shown), or around past the edges of a mirror (not shown) that is smaller than an output aperture (not shown) such as in the case of an unstable resonator. Although output coupler 73 and/or a predetermined geometry, such as an unstable resonator, can operate as a means for extracting energy from resonator 30, any means of extracting energy, such as a passive quarter wave rotator and a polarizing beamsplitter 76 can also be employed without departing from the scope of the invention. In addition, passive quarter wave rotator and a polarizing beamsplitter 76 is capable of being substituted with optical devices known in the art, such as optical Q-switches and/or optical modulators to enable resonator 30 to be operated in a Q-switched, cavity dumped and/or mode locked condition.

Although the preferred embodiment of the present invention is that of a power oscillator 30 as illustrated in FIG. 4, the normal incidence stack architecture can be equally useful when used as a multi-pass amplifier in a master oscillator power amplifier (i.e., MOPA) geometry. A MOPA is a method of generating a stable input laser signal from a small but well-controlled laser oscillator, which can then be amplified through a chain of laser amplifiers. Although technically more complex, this approach can greatly expand the versatility of laser output available from the present invention. As an amplifier, the normal incidence stack would support a variety of optical architectures well known in the art including regenerative, angularly multi-plexed multi-pass, chirped pulse, as well as simple single-pass-amplifier geometries. In this way the apparatus of the present invention can produce one pulse to a plurality of laser pulses with pulse durations from about less than 1 picosecond to pulse durations of about 2 or more milliseconds, or can even operate continuously (i.e., CW). For pulsed operation, the repetition rate can vary between single shot operation up to 10 kHz, limited only by the repetition frequency capability of available diode arrays. Average powers in operation can range from about 5 kW watts to about 100 kW However, conceptual designs that emit several MW have been made. It can reasonably be expected that new materials interaction research experiments will be found, which are only possible with the output parameters of this apparatus. Its high power, low optical distortions in a compact geometry lends itself to a wide range of possibilities in which the military and civilian sector will have an equal interest.

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

What is claimed is:

1. An apparatus, comprising:
   a laser gain medium having a front entry surface and a back entry surface,
   a source of electromagnetic radiation directed at said front entry surface and said back entry surface so as to provide a selected wavelength band for optically pumping said gain medium at a designed angle θ with respect to said front and said back entry surfaces of said gain medium, where θ is greater than 0°,
   an optical cavity, further comprising said gain medium, wherein said gain medium is oriented substantially normal to an incident light having a predetermined wavelength and wherein said incident light beam is resonant within said optical cavity and amplified in energy due to the optical pumping of said gain medium from said radiation source; and
   an optical means for extracting said amplified light beam from said optical cavity.

2. The apparatus of claim 1, wherein said gain medium is oriented between about 0 degrees and plus or minus about 15 degrees along a horizontal axis with respect to said incident light beam.

3. The apparatus of claim 1, wherein said source of electromagnetic radiation emits said selected wavelength band at said designed angle θ between about 25 degrees and about 75 degrees with respect to said incident light beam.

4. The apparatus of claim 3, wherein said source of electromagnetic radiation band further comprises one or more laser diodes arranged as one or more pump array surfaces to provide said selected wavelength band at said designed angle θ.

5. The apparatus of claim 4, wherein said one or more laser diodes further comprise a plurality of laser diode bars arranged as one or more pump array surfaces to provide said selected wavelength at said designed angle θ.

6. The apparatus of claim 4, wherein said designed angle θ for said laser diodes is predetermined by said laser diodes being fixedly attached to a plurality of V-groove <111> planes on one or more silicon substrates.

7. The apparatus of claim 5, wherein said designed angle θ for said laser diode bars are predetermined by said laser diode bars being fixedly attached to a plurality of V-groove <111> planes on one or more silicon substrates.

8. The apparatus of claim 1, wherein said optical cavity further comprises one or more reflective surfaces such that said light beam will pass through gain medium at least once and will be reflected off of said one or more reflective surfaces at least once such that said light beam will execute two or more approximately closed path cycles within said cavity.

9. The apparatus of claim 1, wherein said electromagnetic radiation is directed to pump said front and back surfaces of said gain medium to establish a predetermined gain volume of excited state ions, wherein said light beam of said predetermined wavelength is capable of being emitted and is capable of being amplified by said gain medium in response to said electromagnetic radiation.

10. The apparatus of claim 1, wherein said gain medium includes a laser gain material selected from the group consisting of Neodymium(Nd)-doped glass, Neodymium-doped yttrium lithium fluoride, Nd:GCG, Yb:glass, and Yb:YAG.

11. The apparatus of claim 4, wherein said source of electromagnetic radiation further comprises at least one pump array surface to said gain medium.

12. The apparatus of claim 4, wherein said source of electromagnetic radiation further comprises four pump array surfaces to pump said gain medium.

13. The apparatus of claim 5, wherein said source of electromagnetic radiation further comprises at least one pump array surface to pump said gain medium.

14. The apparatus of claim 5, wherein said source of electromagnetic radiation further comprises four pump array surfaces to pump said gain medium.

15. The apparatus of claim 1, wherein said gain medium is cooled during laser operation.

16. The apparatus of claim 1, wherein said gain medium is cooled after laser operation.

17. The apparatus of claim 1, wherein said medium is cooled by flowing a gas, wherein a gas supply plenum provides said gas to a flow channel constructed to provide said gas to a flow window adapted on said front and back surfaces of said laser gain medium to produce a laminar flow of said gas.

18. The apparatus of claim 17, wherein a liquid mist is introduced during an increased flow velocity of said gas to produce a turbulent flow at a boundary on said front and back surfaces of said gain medium so that said laser gain medium is cooled rapidly.

19. The apparatus of claim 8, wherein said one or more reflective surfaces further comprises a pair of highly reflective surfaces at said predetermined wavelength to produce at least two passes through said gain medium, and a partial reflective surface at said predetermined wavelength, wherein said partial reflective surface is capable of transmitting an output amplified beam.

20. The apparatus of claim 1, wherein said optical means for extracting said amplified light beam further comprises a passive quarter wave rotator and a polarizing beamsplitter.

21. The apparatus of claim 19, wherein said reflective surfaces are configured as an unstable resonator cavity.

22. The apparatus of claim 21, wherein said reflective surfaces are adapted to provide a folded cavity.

23. The apparatus of claim 21, wherein optical distortion of a transmitted wavefront through said gain medium is minimized, astigmatism is minimized and wherein said transmitted wavefront is less than three times diffraction limited.

24. The apparatus of claim 1, wherein Amplified Spontaneous Emission within said gain medium that is oriented substantially normal to said incident light beam, is minimized and wherein a resultant higher gain and energy storage within said gain medium is maximized.

25. The apparatus of claim 1, wherein energy extraction from gain medium is independent of an input beam polarization.

26. The apparatus of claim 1, wherein said gain medium further comprises a laser gain material having transverse dimensions between about 1 cm×1 cm and about 40 cm×40 cm and a thickness of up to 4 cm.

27. The apparatus of claim 1, wherein said gain medium has an anti-reflection coating applied to said front and back surfaces for said predetermined wavelength and for said selected wavelength band for optically pumping.

28. An apparatus, comprising:
one or more laser gain disks, each having a front entry planar surface and a back planar entry surface,
one or more diode pump array surfaces configured to provide a selected wavelength band that is directed at said front and back planar entry surfaces of said one or more laser gain disks at a designed angle θ, so as to pump and establish a predetermined gain volume of excited state ions,
an optical cavity, defined along an optic axis, containing said one or more laser gain disks that are each oriented substantially normal to an incident light beam collinear with said optic axis, and including one or more reflective surfaces such that said light beam will pass through said one or more laser gain disks at least once and will be reflected off of said one or more reflective surfaces at least once such that said light beam will execute two or more approximately closed path cycles within said cavity, wherein said light beam is amplified because of the interaction with said gain volume of excited state ions in each of said one or more laser gain disks; and
an optical means for extracting said amplified light beam from said optical cavity.

29. The apparatus of claim 28, wherein said designed angle θ for said diode pump array sources is predetermined by a plurality of laser diodes being fixedly attached to a plurality of V-groove <111> planes on one or more silicon substrates.

30. The apparatus of claim 28, wherein said designed angle θ for said diode pump array sources is predetermined by a plurality of laser diode bars being fixedly attached to a plurality of V-groove <111> planes on one or more silicon substrates.

31. The apparatus of claim 28, wherein said designed angle θ is between about 30 and about 40 degrees with respect to said light beam.

32. The apparatus of claim 28, further comprising four pump array surfaces to pump each of said one or more laser gain disks.

33. The apparatus of claim 29, wherein said laser diodes further comprise semi-conductor material selected from the group consisting of GaP, GaAs, GaAsP, GaAlAs, AlAs, GaInP, InP, InAsP, InGaAs, and In Ga AsP.

34. The apparatus of claim 28, wherein said apparatus is capable of producing single shot operation up to a repetition rate of about 10 kHz with a high average power of at least 5 kW watts.

35. The apparatus of claim 28, wherein said one or more laser gain disks further comprises an optical laser gain material selected from the group consisting of Nd:GGG, Neodymium(Nd)-doped glass, Neodymium-doped yttrium lithium fluoride Yb:glass, and Yb:YAG.

36. The apparatus of claim 28, wherein said one or more laser gain disks are cooled during laser operation.

37. The apparatus of claim 28, wherein said one or more laser gain disks are cooled after laser operation.

38. The apparatus of claim 28, wherein said one or more laser gain disks are cooled by flowing a gas, wherein a gas supply plenum provides said gas to a flow channel constructed to provide said gas to a flow window adapted on said front and back surfaces of said laser gain disks to produce a laminar flow of said gas.

39. The apparatus of claim 38, wherein a liquid mist is introduced during an increased flow velocity of said gas to produce a turbulent flow at a boundary on said surfaces of said laser gains disks such that said laser gain disks are rapidly cooled.

40. The apparatus of claim 28, wherein said reflective surfaces are adapted to provide an unstable resonator cavity.

41. The apparatus of claim 40, wherein said reflective surfaces are adapted to provide a folded cavity.

42. The apparatus of claim 28, wherein optical distortion of a transmitted wavefront through said laser gain disks is minimized, Amplified Spontaneous Emission and astigmatism is minimized and wherein said transmitted wavefront is less than three times diffraction limited.

43. The apparatus of claim 28, wherein energy extraction from said one or more laser gain disks are independent of an input beam polarization.

44. A method comprising:
optically pumping one or more substantially normal incidence laser gain disks by directing a predetermined wavelength band at a front entry surface and a back entry surface from one or more diode pump array surfaces at a designed angle θ, wherein said laser gain disks are contained within an optical cavity,
passing a light beam of a predetermined wavelength through said one or more laser gain disks at least once,
reflecting said light beam off of one or more reflective surfaces at least once such that said light beam will execute two or more approximately closed path cycles within said optical cavity, wherein said light beam is amplified by said optically pumped laser disks; and
extracting an amplified light beam by an optical means.

45. The method of claim 44, wherein said one or more laser gain disks are oriented between about 0 degrees and plus or minus about 15 degrees along a horizontal axis with respect to said light beam.

46. The method of claim 44, wherein said diode pump array surfaces emits a selected wavelength band at an angle between about 25 degrees and about 75 degrees with respect to said light beam.

47. The method of claim 44, wherein said designed angle θ for said diode pump array surfaces is predetermined by a plurality of laser diodes being fixedly attached to a plurality of V-groove <111> planes on one or more silicon substrates.

48. The method of claim 44, wherein said designed angle θ for said diode pump array surfaces is predetermined by a plurality of laser diode bars being fixedly attached to a plurality of V-groove <111> planes on one or more silicon substrates.

49. The method of claim 44, wherein said one or more laser gain disks further comprises an optical laser gain material selected from the group consisting of Nd:GGG, Neodymium(Nd)-doped glass, Neodymium-doped yttrium lithium fluoride Yb:glass, and Yb:YAG.

50. The method of claim 44, further comprising four pump array surfaces to optically pump each of said one or more laser gain disks.

51. The method of claim 44, wherein the step of optically pumping includes optically pumping said gain disk in a format selected from the group consisting of Q-switched, mode locked, free running, continuous wave and cavity dumped.

52. The method of claim 44, wherein said one or more laser gain disks are cooled during laser operation.

53. The method of claim 44, wherein said one or more laser gain disks are cooled after laser operation.

54. The method of claim 44, wherein said one or more laser gain disks are cooled by flowing a gas, wherein a gas supply plenum provides said gas to a flow channel which is constructed to provide said gas to a flow window adapted on said front and back surfaces of said laser gain disks to produce a laminar flow of said gas.

55. The method of claim 54, wherein a liquid mist is introduced during an increased flow velocity of said gas to produce a turbulent flow at a boundary on said surfaces of said laser gains disks such that said laser gain disks are rapidly cooled.

56. The method of claim 44, wherein said method is capable of producing single shot operation up to a repetition rate of about 10 kHz with a high average power of at least 5 kW watts.

57. The method of claim 44, wherein said optical cavity further comprises one or more reflective surfaces such that said light beam will pass through each of said laser gain disks at least once and will be reflected off of said one or more reflective surfaces at least once such that said light beam will execute two or more approximately closed path cycles within said cavity.

58. The method of claim 44, wherein said pump array surfaces are thermoelectrically cooled.

* * * * *

UNITED STATES PATENT AND TRADEMARK OFFICE
CERTIFICATE OF CORRECTION

PATENT NO. : 6,847,673 B2
DATED : January 25, 2005
INVENTOR(S) : C. Brent Dane, Georg F. Albrecht and Mark D. Rotter It is certified that error appears in the above-identified patent and that said Letters Patent is hereby corrected as shown below:

Title page,
Item [54], Title, should read:
-- SOLID STATE LASER DISK AMPLIFIER ARCHITECTURE: THE NORMAL-INCIDENCE STACK --.

Signed and Sealed this

Sixth Day of September, 2005

JON W. DUDAS
*Director of the United States Patent and Trademark Office*